US008132831B1

(12) United States Patent
Walker, Jr.

(10) Patent No.: US 8,132,831 B1
(45) Date of Patent: Mar. 13, 2012

(54) CONNECTOR FOR USE WITH INFLATABLE TUBING

(76) Inventor: Mark S. Walker, Jr., Hesperia, CA (US)

(*) Notice: Subject to any disclaimer, the term of this patent is extended or adjusted under 35 U.S.C. 154(b) by 0 days.

(21) Appl. No.: 12/955,683

(22) Filed: Nov. 29, 2010

Related U.S. Application Data

(62) Division of application No. 12/035,902, filed on Feb. 22, 2008, now Pat. No. 7,841,087.

(60) Provisional application No. 60/891,319, filed on Feb. 23, 2007.

(51) Int. Cl.
*F16L 41/00* (2006.01)

(52) U.S. Cl. ........................................ 285/200; 285/192

(58) Field of Classification Search .................. 285/200, 285/193, 192, 189, 208, 203
See application file for complete search history.

(56) References Cited

U.S. PATENT DOCUMENTS

| | | | |
|---|---|---|---|
| 2,308,310 | A | 1/1943 | Ruemelin, Jr. et al. |
| 2,427,477 | A | 9/1947 | Shapiro |
| 2,940,777 | A | 6/1960 | Lundberg |
| 3,233,627 | A | 2/1966 | Cebula |
| 3,324,846 | A | 6/1967 | Smith |
| 3,805,405 | A | 4/1974 | Ambos |
| 4,000,620 | A | 1/1977 | Burge |
| 4,251,032 | A | 2/1981 | Werding |
| 4,391,619 | A | 7/1983 | Shono et al. |
| 5,069,114 | A | 12/1991 | Sodec et al. |
| 5,145,216 | A | 9/1992 | Valls, Jr. |
| 5,155,924 | A | 10/1992 | Smith |
| 5,165,604 | A | 11/1992 | Copp, Jr. |
| 5,174,048 | A | 12/1992 | Shero |
| 5,408,759 | A | 4/1995 | Bass |
| 5,419,059 | A | 5/1995 | Gausch |
| 5,456,023 | A | 10/1995 | Farnan |
| 5,555,643 | A | 9/1996 | Guasch |
| 5,590,478 | A | 1/1997 | Furness |
| 5,599,229 | A | 2/1997 | Claunch et al. |
| 5,611,151 | A | 3/1997 | Jacob |
| 5,709,412 | A | 1/1998 | Vadas |
| 5,727,330 | A | 3/1998 | Cucchi et al. |
| 5,761,827 | A | 6/1998 | Guasch |
| 5,813,139 | A | 9/1998 | Lillicotch |
| 5,893,216 | A | 4/1999 | Smith et al. |
| 6,125,538 | A | 10/2000 | Vada |
| 6,647,639 | B1 | 11/2003 | Storrer |
| 6,662,467 | B2 | 12/2003 | Cressy et al. |
| 6,691,427 | B1 | 2/2004 | Fernandes et al. |
| 6,739,070 | B1 | 5/2004 | Jacobs et al. |
| 6,871,880 | B1 | 3/2005 | Olson |
| 6,886,271 | B2 | 5/2005 | Storrer |
| 7,059,638 | B2 | 6/2006 | Charrette et al. |

(Continued)

OTHER PUBLICATIONS

DriForce® InterAir Drying System, website printout, 1 pg.

(Continued)

*Primary Examiner* — David E Bochna
(74) *Attorney, Agent, or Firm* — Knobbe, Martens, Olson & Bear, LLP

(57) ABSTRACT

A system for moving fluid from one location to another. The system comprising a fluid delivery system, a first piece of flexible tubing that receives fluid from the fluid delivery system and a second piece of flexible tubing. The system further includes a connector having an aperture that receives the second piece of flexible tubing. The connector is then positioned inside the first piece of flexible tubing so that the connector is urged against the inner walls of the first piece of flexible tubing so that fluid can be communicated from the first piece of flexible tubing to the second piece of flexible tubing.

7 Claims, 5 Drawing Sheets

U.S. PATENT DOCUMENTS

| | | | |
|---|---|---|---|
| 7,841,087 | B1 | 11/2010 | Walker, Jr. |
| 2005/0252380 | A1 | 11/2005 | Gastaldi et al. |
| 2006/0000110 | A1 | 1/2006 | Aisenberg et al. |
| 2006/0049615 | A1 | 3/2006 | Day |
| 2006/0143936 | A1 | 7/2006 | Studebaker |

OTHER PUBLICATIONS

U.S. Appl. No. 12/257,300, filed Oct. 23, 2008, Mary S. Walker et al.
U.S. Appl. No. 12/860,474, filed Aug. 20, 2010, Mark S. Walker.

CONNECTOR FOR USE WITH INFLATABLE TUBING

CROSS-REFERENCE TO RELATED APPLICATIONS

This application is a divisional application of U.S. patent application Ser. No. 12/035,902, filed Feb. 22, 2008 (U.S. Pat. No. 7,841,087), which claims the benefit of U.S. Provisional Application No. 60/891,319, filed Feb. 23, 2007, entitled "Temporary Connector for Use with Inflatable Cylindrical Tubing", which are hereby incorporated by reference in there entirety.

BACKGROUND OF THE INVENTION

1. Field of the Invention

The present invention relates to inflatable flexible tubing and, in particular, concerns a connector that allows for additional pieces of inflatable flexible tubing to be connected to inflated pieces of inflatable flexible tubing.

2. Description of the Related Art

Flooding of buildings, such as offices and houses, can occur for a wide variety of different reasons. Rivers can overflow, sprinkler systems can go off, washing machine or dishwasher hoses can rupture and the like. In all of the circumstances, the interior rooms of the building can become flooded. If the moisture content is not quickly removed from the flooded areas of the buildings, mold can develop which can, in some extreme circumstances, render the building unoccupiable.

To address this particular problem, flood damage specialists typically deploy drying systems that provide air, such as dry air or even heated dry air, into the flooded areas in order to remove the moisture in the walls, floors, carpet, furniture, etc. in the flooded portions of the building. Typically, a dehumidifier and heater are often used to generate warm, dry air that is then circulated into the flooded areas. Oftentimes, an extraction fan is also used so that the air in the flooded portions of the buildings is continuously exchanged.

It is preferable to be able to direct the air into specific rooms of the flooded building. Generally, this is accomplished by using inexpensive plastic tubing, such as lay-flat tubing, that is coupled to an air source so as to provide the warmed, dried air into a particular room or space.

Typically, the air is provided into the building by a larger section of tubing, commonly referred to as a trunk line, that is coupled to the air source and extends in a generally straight line from the point of entry into the building. Oftentimes, the air source is located outside of the building as oftentimes the air source can be quite large. Generally, subsidiary lines of lay-flat tubing are attached to the trunk line so as to extend into other rooms or spaces within the building. Attachment of the subsidiary lines onto the main trunk line of the lay-flat tubing can, however, be complicated.

Generally, the lay-flat tubing is flexible plastic tubing formed of a material, such as a polypropylene type of material usually having a thickness of approximately 5 to 6 mils. Generally, in the prior art, the attachment of subsidiary lines onto trunk lines or any other attachment of one section of flexible plastic tubing onto another section of flexible plastic tubing, is accomplished using either standard ducting connectors or with various coupling rings. More specifically, T or Y connectors made of metal such as tin, aluminum or the like that are used in round metal ducting applications can be used to interconnect different pieces of flexible plastic tubing. While this does afford a mechanism for attaching one piece of flexible plastic tubing onto another, this requires that the installer have multiple connectors with them that are bulky and are subject to damage. Moreover, the flexible plastic tubing typically has to be taped to the connector which further complicates the connection process.

An alternative to using standard metal ducting connectors is to use a clamp-type connector to interconnect pieces of tubing. More specifically, it is common for installers of lay-flat tubing to cut an X-shaped hole into a first piece of flexible plastic tubing. The flaps that are formed as a result of the X-shaped opening are then rolled up and the roll-up flaps are connected to a end piece of the new flexible plastic tubing using some type of connector, such as a hog ring or C-ring connector. While the hog ring or C-ring connectors are smaller in size and easier to transport, this form of connection of one piece of inflatable plastic tubing to another often results in a substantial loss of pressurized air at the connection point as the pieces of plastic tubing are only coupled to one another at the locations of the hog ring or C-ring connectors. To address that difficulty, installers often use duct tape or other types of tape to seal the interface between the two pieces of inflatable plastic tubing.

From the foregoing, it will be appreciated that the various forms of connecting two pieces of plastic tubing suffer from several difficulties. Initially, each of these connection methods requires the use of components that oftentimes are easily damaged or are not reusable. Moreover, in order to achieve the connection between the two pieces of flexible plastic tubing and reduce leaks, the additional time and expense of applying duct tape to the interface is often required. Further, generally large amounts of tubing is required in order to form the necessary connection which means that the above-described connection mechanisms known become more complicated when tubing with smaller and smaller diameters are being interconnected together.

It will be appreciated that lay-flat tubing is also used in a variety of other different applications. For example, this type of tubing is also used for irrigation purposes where water or other liquid is flowed through the tubing. The connection issues discussed above in connection with air also apply with respect to other uses of flexible plastic tubing such as lay-flat tubing.

Hence, it will be appreciated from the foregoing that there is a need for an improved method and assembly for interconnecting flexible plastic tubing, such as lay-flat tubing used to address water damaged areas. To this end, there is a need for a method and system for attaching flexible plastic tubing that reduces the amount of labor that is required to interconnect two pieces of tubing and further does not require the use of expensive or easily damaged components.

SUMMARY OF THE INVENTION

The aforementioned needs are satisfied, in one particular implementation, by a method of attaching two pieces of flexible tubing of the present invention. In one particular implementation, the method comprises threading the end of a first piece of flexible plastic tubing, such as lay-flat tubing, through an aperture in a connector or retainer. In this implementation, the retainer has a rim or lip that surrounds the aperture. The method further comprises forming an opening in the side wall of a second piece of flexible plastic tubing that is pressurized by a fluid such as air or water, such as lay-flat tubing. The method further comprises positioning the connector with the end of the first piece of flexible plastic tubing thread therethrough through the opening so that the connector is positioned proximate the interior side walls of the second piece of flexible plastic tubing.

The pressure of the fluid inside the second piece of flexible plastic tubing urges the connector against the interior sidewall thereby forming a relatively fluid-tight seal between the first and second pieces of flexible plastic tubing. In one implementation, the end pieces of the first piece of flexible plastic tubing are folded over the connector so that they are interposed between connector and the inner wall of the second piece of flexible plastic tubing so as to enhance the air-tight integrity of the first and second pieces of flexible plastic tubing.

In another aspect, the present invention comprises a first piece of flexible plastic tubing that is pressurized by a fluid wherein a hole is cut in a first piece of flexible plastic tubing, and a connector or retaining member defining an aperture that is positioned within the first inflated piece of flexible plastic tubing so as to surround the hole cut in the first piece of flexible plastic tubing. In this particular implementation, the invention further comprises a second piece of flexible plastic tubing, wherein the open end of the second piece of flexible plastic tubing is positioned through the hole in the first piece of flexible plastic tubing and also through the aperture in the connector so that pressurized fluid in the first piece of flexible plastic tubing urges the edges of the second piece of flexible plastic tubing against the connector and further urges the retainer against the interior wall of the first piece of flexible plastic tubing to thereby provide a generally sealed interconnection between the first and second pieces of flexible plastic tubing.

It will be appreciated that the system and method disclosed herein provide a simple and effective way of interconnecting a first and second piece of flexible plastic tubing. These and other objects and advantages of the present invention will become more apparent from the following description taken in conjunction with the accompanying drawings.

DETAILED DESCRIPTION OF THE PREFERRED EMBODIMENT

Figure 1:
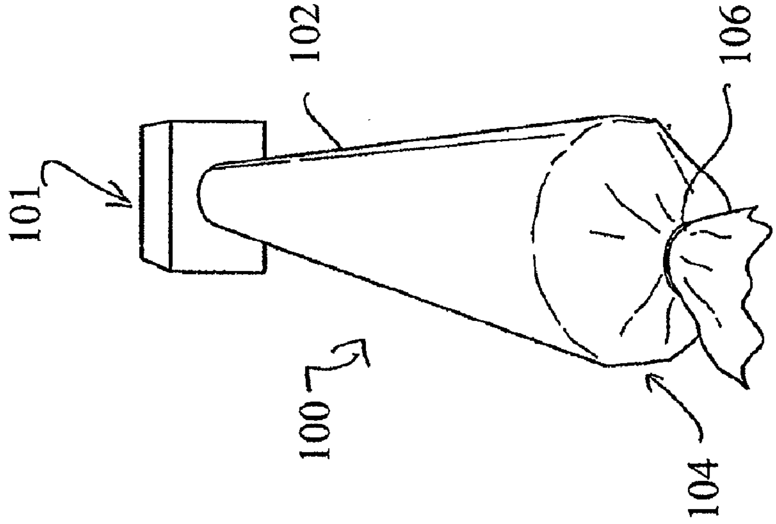
FIG. 1 is a perspective view of a first piece of flexible plastic tubing and a fluid source.

Reference will now be made to the drawings wherein like numerals refer to like parts throughout. As shown in FIG. 1, a trunk line 102 of a flexible tubing material attached to a fluid source 101 is shown. In this particular implementation, the trunk line 102 is comprised of flexible plastic tubing, such as lay-flat tubing. The lay-flat tubing is formed of a plastic material, such as polypropylene or other similar plastic material, which is typically approximately 5-6 mils thick. The lay-flat tubing can have an interior diameter of between the ranges of 4 and 26 inches or more although the exact sizes and dimensions of the lay-flat tubing 102 vary depending upon the application. In this particular implementation, the trunk line 102 is attached to a fluid supply unit 101, which can be any of a number of different fluid supply units that provide fluids, such as pressurized air or water. In one implementation, the unit 101 supplies heated and dried air to the flexible tubing 102, although in other implementations only ambient air or water is supplied that is neither dried nor heated.

The type of fluid that is being supplied to the tubing is dependent upon the environmental circumstances to which the fluid is to be supplied. For example, in more humid drying applications that have greater water damage, it may be desirable to supply larger volumes of both heated air, e.g., heated to a temperature of approximately 125° F., and also desiccated air in order to enhance the removal of moisture from the interior of buildings. The exact size of the air supply unit 101 also depends largely upon the amount of water that is to be removed and the size of the premises in which the system 100 is to be positioned. Exemplary air supply units 101 include air movers, fans, desiccant dehumidifiers, carpet dryers, refrigerant dehumidifiers, irrigation pumps and the like. As is shown in FIG. 1, the main trunk line 102 is tied off at an outer end 104 using a tie-off 106 in a manner that is known in the art.

Figure 2:
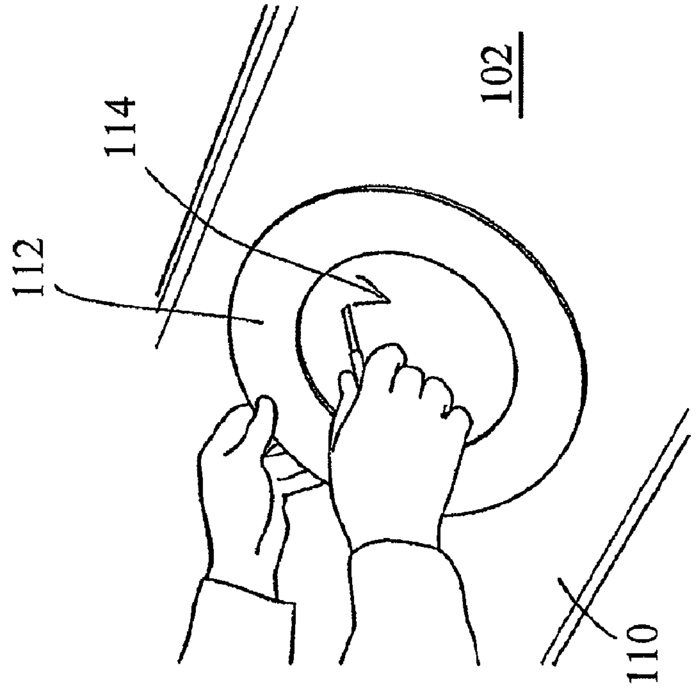
FIG. 2 is a perspective view of a connector or retaining member that is used as a template to cut an opening in the first piece of flexible plastic tubing of FIG. 1.

Referring to FIG. 2, the process by which a secondary flexible tube is attached to the primary flexible tube 102 is illustrated. Specifically, FIG. 2 illustrates that a connector 112 defining an aperture 114 is positioned proximate to the outer surface 110 of the primary tubing 102. The user can then use a sharp instrument, such as a utility knife, pocket knife or the like, to cut an opening into the outer wall of the primary tubing 102. Preferably the size of the cut is less than the size of the aperture 114 in the connector 112. Cutting the opening in the primary tube 102 to be less than the size of the aperture 114 results in the connector 112 being retained inside the interior of the primary tube 102 in the manner that will be described in greater detail below.

Figure 4:
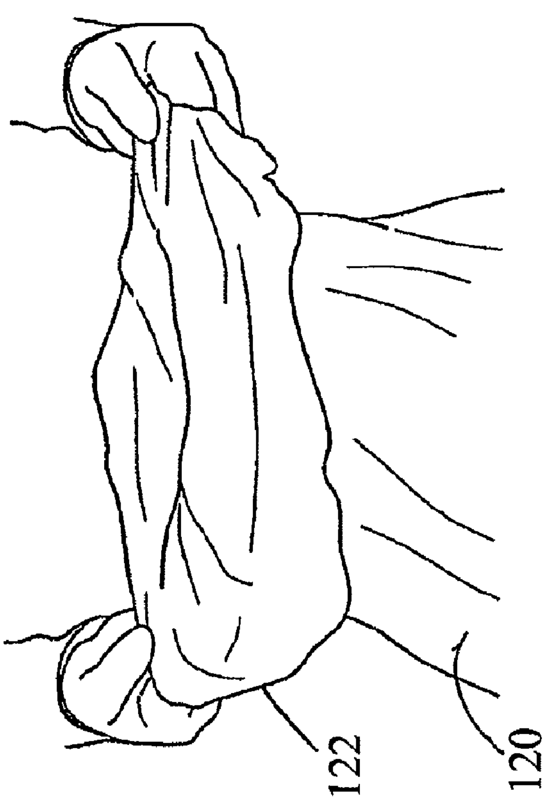
FIG. 4 is an illustration showing the second piece of flexible plastic tubing being positioned around the edges of the connector of FIG. 3.
Figure 3:
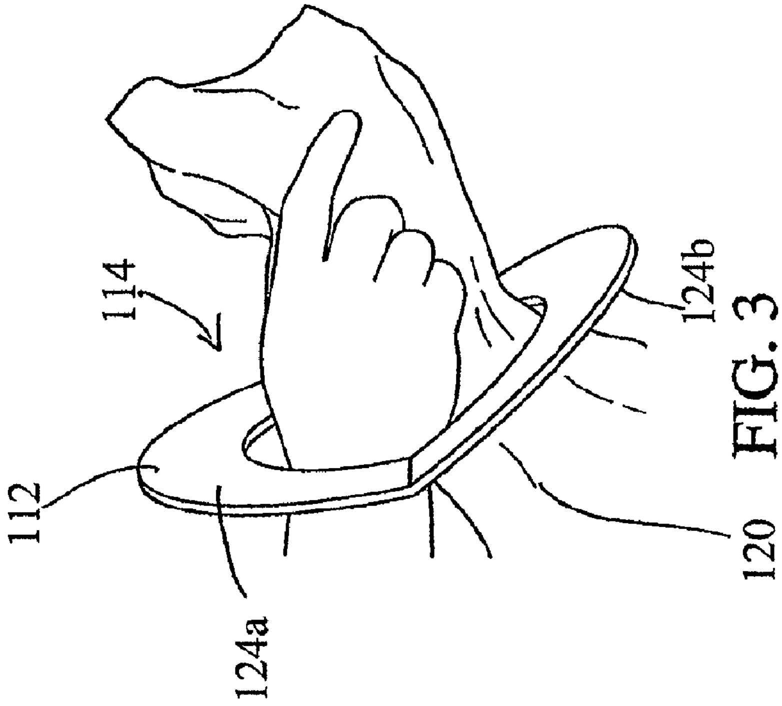
FIG. 3 is an illustration of a second piece of flexible plastic tubing being positioned through an aperture in the connector of FIG. 2.

As is shown in FIG. 3, the secondary tubing 120 is then positioned through the aperture 114 so as to extend therethrough in the manner shown in FIG. 3. The ends 122 of the secondary flexible tube 120 are then folded over the front face 124*a* of the connector 112 and preferably adjacent the back face 124*b*. Once the secondary plastic tubing is positioned about the connector 112 in the manner shown in FIG. 4, the connector 112 with the secondary flexible tube 120 positioned thereon is inserted through the opening that had been previously cut in the primary tube 102 in the manner described above in reference to FIG. 2.

Figure 6:
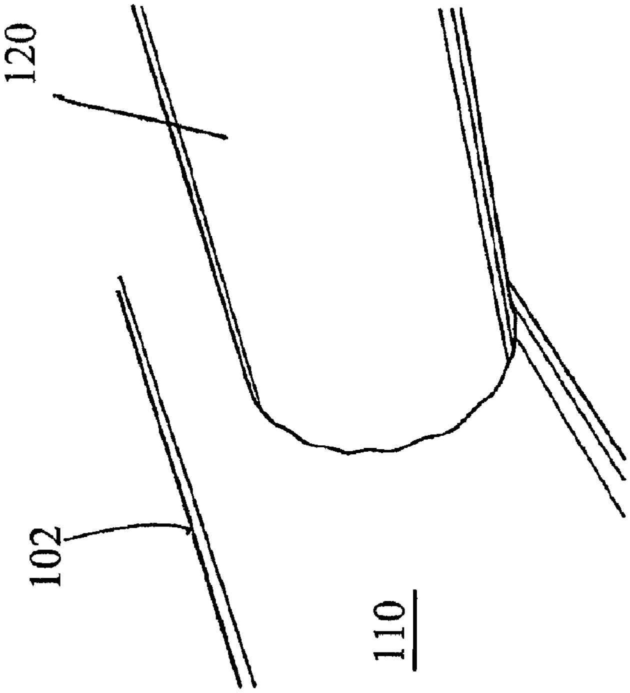
FIG. 6 comprises an illustration of the first and second flexible plastic tubing being interconnected.
Figure 5:
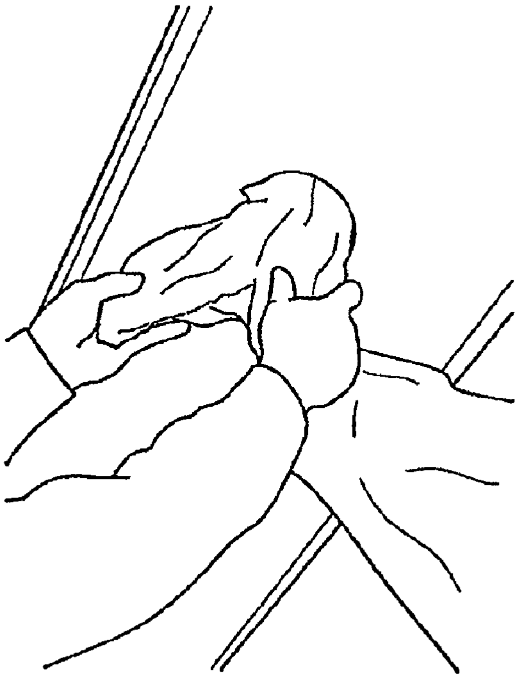
FIG. 5 is a perspective view illustrating the insertion of the second piece of flexible plastic member as it is positioned about the connector in the manner shown in FIG. 4 into the hole formed in the first piece of flexible plastic tubing shown in FIG. 2.
Figure 8:
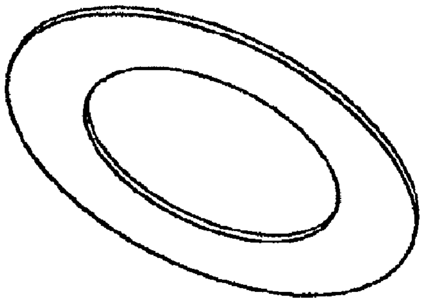
FIG. 8 is a perspective view of the connector illustrated above in connection with FIGS. 1-7.
Figure 7:
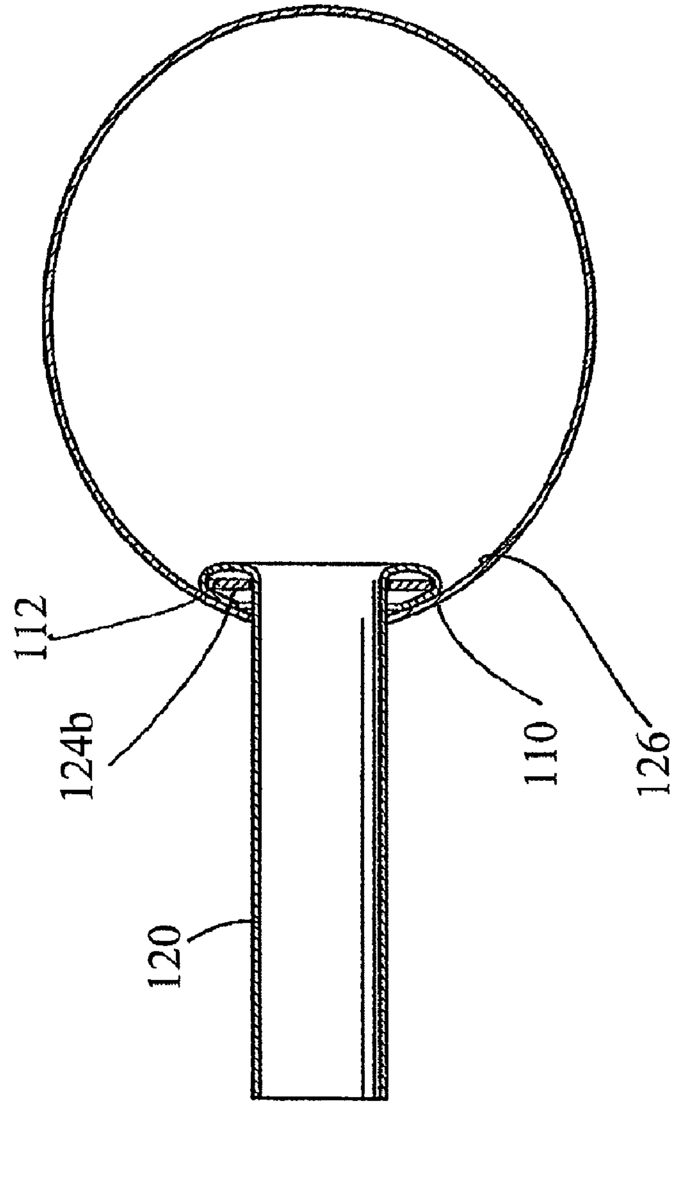
FIG. 7 is a cross-sectional view of the interconnection of the first and second pieces of flexible plastic tubing shown in FIG. 6.

As is shown in FIGS. 6 and 7, the connector 112 is preferably positioned such that the back surface 124*b* is positioned adjacent an inner surface 126 of the primary tube 102. As the primary tube 102 is pressurized, the pressure of the fluid urges the connector 112 into close contact with the inner surface 126 of the primary tube 102, thereby resulting in a more fluid-tight interconnection between the primary tube 102 and the secondary tube 120. It will be appreciated that the interconnection between the primary tube 102 and the secondary tube 120 can thus be accomplished without requiring as much use of additional sealing materials, such as tape, in order to achieve a relatively fluid-tight connection. Commonly, the opening cut in the primary flexible tube 102 is approximately the width of the faces 124, of the connector 112 e.g., typically 1 to 3 inches although the exact size can vary depending upon the implementation. Higher pressure fluids will generally require greater amounts of engagement between the connector 112 and the interior wall to ensure that the secondary tubing 104 does not become dislodged.

Further, the connectors can comprise a relatively flat piece of resilient or bendable material, such as cardboard, metal or the like, and can vary greatly in size, e.g., ranging from typically 2" to 30" in lateral dimensions. It will be further appreciated that the aperture 114 will, of course, vary depending upon the size of the secondary tube that is to be coupled to the primary tube. It will also be further appreciated that the interconnection between the primary tube and the secondary tube can be achieved in a very quick and efficient fashion by simply forming the cut, mounting the secondary tube onto the connector and then positioning the retainer into the primary tube. In fact, the secondary tube can be pre-installed on the connector without departing from the spirit of the present invention. In this implementation, the connection has been described as being between a primary tube and a secondary tube. It will be appreciated that the primary and secondary tubes can include main trunk lines with branch lines extending there from secondary lines with additional lines extending there from without departing from the spirit of the present invention. Moreover, the tubing may be cylindrical or have any of a number of different cross-sections. It will be further understood, the use of the terms primary and secondary with respect to tube simply refer to one tube being installed to another tube and do not reflect the functionality of the tubes. The interconnection can be accomplished between trunk lines and secondary lines, secondary lines and even smaller subsidiary lines etc. without departing from the spirit of the present invention.

As discussed above, the connector is generally illustrated as being a ring-shaped disk having a cross-section dimension of typically between 2"-30". The interior opening is dependent upon the size of the secondary tube that is to be installed and can range from 4 inches to 40 inches in diameter. The front and back surfaces, 124*a*, 124*b*, can have a variety of different sizes and, in particular, can range from typically approximately 1 inch to 3 inches in width.

Figure 9A:
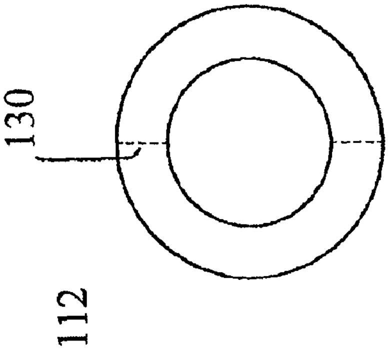
FIGS. 9A and 9B are illustrations of an alternative embodiment of a connector.
Figure 9B:
Figure 10A:
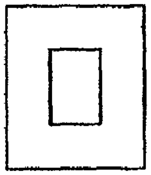
FIGS. 10A-10H each represent additional embodiments of connectors that can be used with the system and method disclosed above in connection with FIGS. 1-7.
Figure 10B:
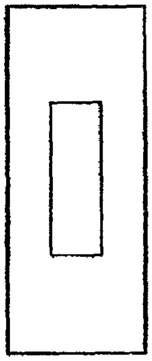
Figure 10C:
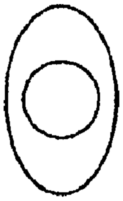
Figure 10D:
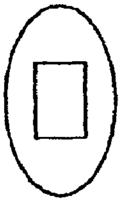
Figure 10E:
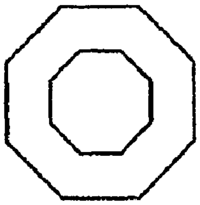
Figure 10F:
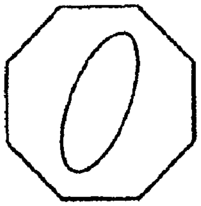
Figure 10G:
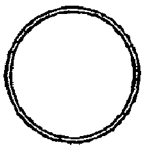
Figure 10H:
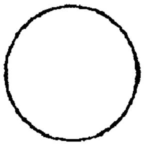

The connector 112 has been described above as being generally ring-shaped, however, it will be appreciated that a variety of different configurations can be used without departing from the spirit of the present invention. For example, as shown in FIGS. 9A and 9B, the connector can comprise a ring that is foldable about a seam 130 to facilitate installation into the primary tube. Further, it should also be appreciated that any of a variety of geometric configurations of the connector can be used without departing from the spirit of the present invention. For example, the connector can generally have a square orientation as shown in FIG. 10A, with a square aperture, or can be rectangular with a rectangular aperture as shown in FIG. 10B, or can be generally oval with a circular opening in the manner shown in FIG. 10C or oval with a different shaped opening in the manner shown in FIG. 10D. Further, the connector 112 can have a generally polygonal shape with a polygonal opening or an ovoid opening in the manner shown in FIG. 10F. Lastly, hoops or rings can also be used in the manner shown in FIGS. 10G and 10H.

Although the foregoing description has shown, described and pointed out the fundamental novel features of the invention, it will be understood that various omissions, substitutions, and changes in the form of the detail of the apparatus and methods as illustrated as well as the uses thereof, may be made by those skilled in the art without departing from the spirit or scope of the present invention. Consequently, the scope of the present invention should not be limited to the foregoing discussion, but should be defined by the appended claims.

What is claimed is:

1. A system for moving fluid from one location to another, the system comprising:

a fluid delivery system;

a first piece of flexible tubing that defines an interior space that receives fluid from the fluid delivery system so that the interior space defined by the first piece of flexible tubing is pressurized;

a second piece of flexible tubing that defines an interior space;

a connector having an aperture, wherein the second piece of flexible tubing is positioned through the aperture and the connector is positioned within the first piece of flexible tubing so that the connector is urged against the inner walls of the first piece of flexible tubing by the fluid contained therein so as to be retained in the first piece of flexible tubing by being urged against the inner walls of the first piece of tubing by the fluid contained therein and wherein the fluid is communicated though the connector into the interior space of the second piece of flexible tubing.

2. The system of claim 1, wherein the fluid delivery system comprises one of a fan, air mover, desiccant dehumidifiers, carpet dryers, refrigerant dehumidifiers, and irrigation water source.

3. The system of claim 1, wherein the first and second pieces of tubing comprises lay flat tubing having interior dimensions of between 4 and 26 inches and is formed of polypropylene having a thickness of approximately 5 to 6 mils.

4. The system of claim 1, wherein the connector comprises a shaped connector defining an aperture that is sized so as to be the approximate outer dimensions of the second piece of flexible tubing.

5. The system of claim 4, wherein the shaped connector comprises at least one of a ring, ovoid, polygon, square, rectangle, or hoop shaped connector.

6. The system of claim 4, wherein the shaped connector is foldable so as to facilitate positioning of the connector into the first piece of flexible tubing.

7. The system of claim 1, wherein the connector is sized so as to be larger than the opening formed in the outer wall of the first piece of flexible tubing.

* * * * *